Patented Nov. 14, 1933

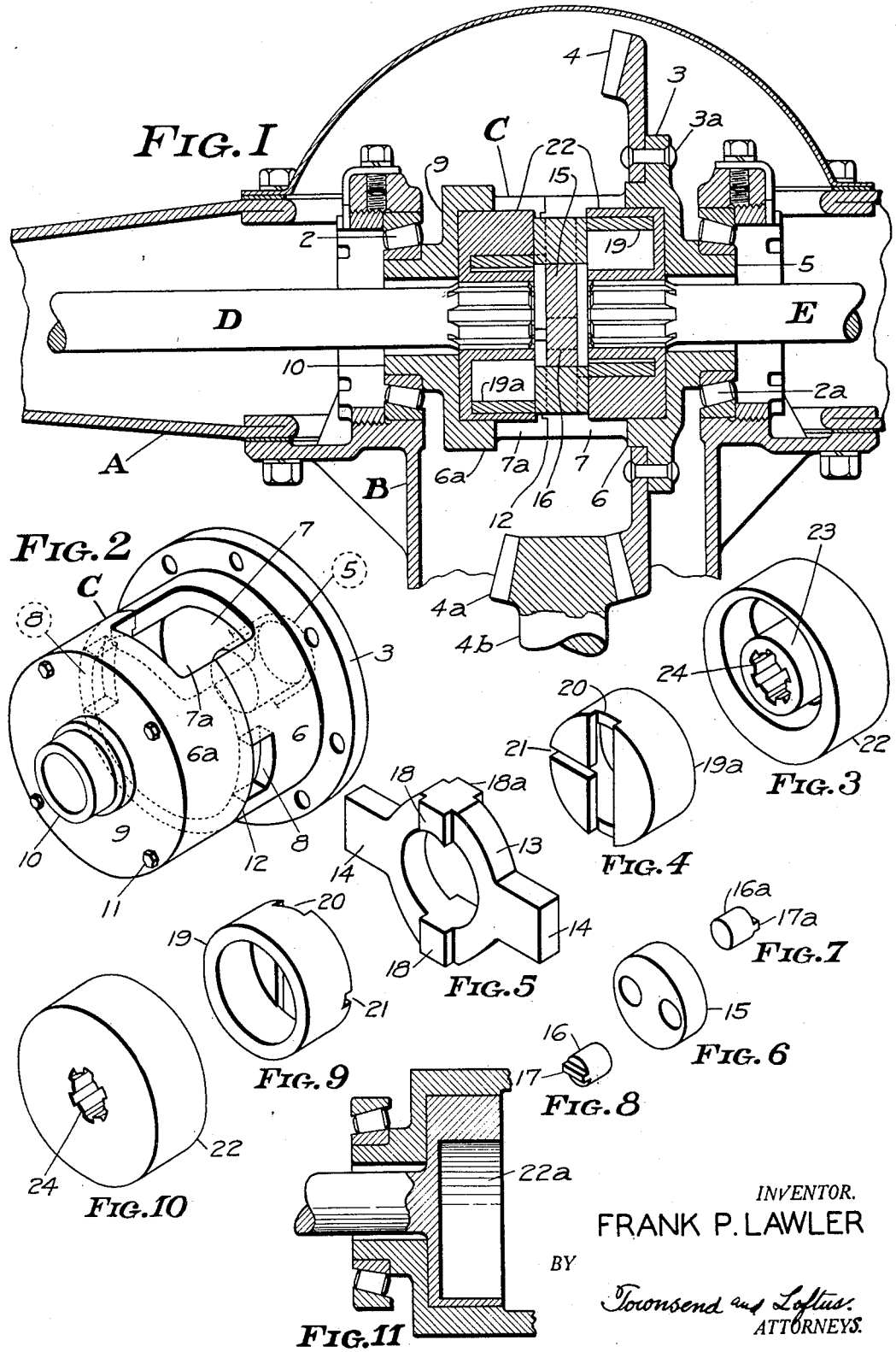
Nov. 14, 1933. F. P. LAWLER 1,934,721
TORQUE DISTRIBUTOR
Filed Dec. 27, 1932
INVENTOR.
FRANK P. LAWLER
BY
Townsend and Loftus.
ATTORNEYS.

1,934,721

UNITED STATES PATENT OFFICE 1,934,721

TORQUE DISTRIBUTOR

Frank P. Lawler, San Francisco, Calif.

Application December 27, 1932
Serial No. 649,017

9 Claims. (Cl. 74—7)

This invention relates to torque distributors, commonly referred to as differentials, and particularly to an improved or modified form of the torque distributor disclosed in my copending application entitled "Torque distributor", filed April 4, 1932, Serial No. 602,963.

The object of the present invention is to generally improve and simplify the construction and operation of torque distributors of the character referred to; to provide a torque distributor of such construction that all loads within the carrier are radial in character, acting on parallel lines and in which no thrust loads of any kind are present; to provide a torque distributor in which the loads transmitted from the compensating rings to their respective eccentrics are located radially directly over the supporting bearing surfaces on which the eccentrics are journaled in the carrier, thus making the forces of action and reaction come directly over one another and preventing any tendency of the operating forces to tilt or cock the eccentrics with relation to the assembly; and further, to provide a torque distributor in which the number of parts employed is reduced and greater strength and a more compact structure obtained.

The torque distributor is shown by way of illustration in the accompanying drawing, in which—

Fig. 1 is a horizontal longitudinal section through the torque distributor and the housing enclosing the same.

Fig. 2 is a perspective view of the carrier.

Fig. 3 is a perspective view of one of the driven eccentrics.

Fig. 4 is a perspective view of one of the compensating rings.

Fig. 5 is a perspective view of the driving plate.

Fig. 6 is a perspective view of the control plate.

Figs. 7 and 8 are perspective views of the control pins.

Fig. 9 is a perspective view of one of the compensating rings.

Fig. 10 is a perspective view of one of the driven eccentrics.

Fig. 11 is a longitudinal section of a driven eccentric formed integral with one of the axles.

Referring to the drawing in detail, and particularly Fig. 1, A indicates a standard form of axle housing and B a torque distributor or differential housing. Mounted within the housing are the usual bearings 2 and 2a, and supported to rotate in said bearings is a carrier generally indicated at C, see Figs. 1 and 2. The carrier consists of two sections, one section having a circular plate 3 on the peripheral edge of which is secured by means of rivets 3a, or the like, a driving gear 4, which is adapted to be driven in the usual manner through a bevel gear pinion 4a secured on a propeller shaft 4b. The circular plate 3 is provided with a hub-like extension 5, which extends into and is supported in the bearing 2a. The opposite side of the plate is provided with a cylindrical extension 6, which is cut away at the points indicated at 7—7 and 8—8, the openings 7—7 being formed to permit admission of a lubricant and the openings 8—8 to form bearings for the driving plate shown in Fig. 5, as will hereinafter be described.

It was previously stated that the carrier C consisted of two sections. The main section, just described, comprises a circular plate 3, the hub 5, and the cylindrical extension 6. The second section consists of a circular plate 9 provided with a hub-like extension 10, which extends into and is supported by the bearing 2. The plate 9 is also provided with a cylindrical extension, as indicated at 6a, and it is secured to the cylindrical extension 6 by means of bolts 11, or the like. The dividing line between the two sections forming the carrier is indicated at 12, and this is substantially midway between the plates 3 and 9. Openings complementary to the openings 7—7 are formed at 7a in the cylindrical extension 6a, but no openings are formed complementary to the openings 8, hence this part of the cylindrical extension 6a forms a bearing cap for the bearing openings 8.

The carrier as a whole forms a housing and support for the following members: First of all a driving plate, such as shown in Fig. 5. This plate is ring-shaped, as shown at 13, and is provided with a pair of extending arms 14, which are journaled in the bearing openings 8—8 of the carrier. The arms 14 and the bearing openings 8 are rectangular in shape to secure the driving plate against rotation but reciprocal movement of the driving plate on an axis longitudinal to the arms 14 is permitted, as will hereinafter be described. A control plate 15 is journaled centrally of the ring-shaped driving plate 13 and the control plate, in turn, supports a pair of control pins 16 and 16a. The pin 16 is provided at one end with a lug 17 and the pin 16a with a lug 17a. The driving plate is also provided with lugs 18 and 18a, the lugs 18 being on one side of the plate and the lugs 18a on the other side. Lugs 18 and 18a form a driving connection between the driving plate and a pair of compensating rings, generally indicated at 19 and 19a. The compensating rings are disposed on opposite sides of the driving plate and their ends are slotted, as shown at 20, to receive the lugs 18 and 18a. The ends of the compensating rings are also slotted on lines at right angles to the slots 20, as shown at 21, and the lugs 17 and 17a project into these slots; the slot 21 projecting at right angles to the slot 20 of the compensating ring 19a at one side thereof, and the slot 21 projecting at right angles to the slot 20 of the compensating ring 19 in a direction opposite to the first named slot 21, that is, the slots 21 are disposed on opposite sides of the slots 20 so that they may be engaged by the lugs 17 and 17a of the respective control pins.

As previously stated, the driving plate is mounted within the carrier being supported in the bearing openings 8—8. The control plate 15 is journaled within the driving plate, and control pins 16 and 16a are journaled in the control plate and the compensating rings 19 and 19a are disposed on opposite sides of the driving plate. They are also mounted within the carrier and they are supported in the following manner: Journaled at opposite ends of the cylindrical portion of the carrier are a pair of driven eccentrics 22. The eccentrics are of the internal type, as clearly shown in Fig. 3. The exterior surface of each eccentric is cylindrical and concentric with the interior cylindrical surfaces of the cylindrical portions 6 and 6a of the carrier, hence the eccentrics are free to rotate within the cylindrical portions of the carrier and they are journaled and supported therein. The compensating rings 19 and 19a are also cylindrical but they are supported and journaled within the internal eccentrics. The compensating rings are sleeve-like or hollow, as clearly shown in Fig. 9, and as such form a clearance with relation to a hub member 23 formed in each driven eccentric. These hub members are concentric to the exterior surface of the eccentrics and they are splined, as shown at 24, to receive the splined ends of a pair of axles, indicated at D and E, these axles serving the usual function of driving the rear wheels of an automobile or like vehicle, the outer ends of the axles being journaled and supported in any manner desired.

From the foregoing description it will be noted that a positive driving connection is formed between the carrier and the driving plate through means of the arms 14 so that the driving plate will always rotate in unison with the carrier. A positive driving connection is also formed between the driving plate and the compensating rings 19 and 19a due to the fact that the lugs 18 and 18a project into the slots or slide-ways 20 formed in the inner faces of the compensating rings. The compensating rings, in turn, form a driving connection between the driving plate and the driven eccentrics 22 and as each eccentric is provided with a splined hub 23 and the axles D and E are splined and extended into these hubs, a driving connection is made between the same.

In actual practice if a vehicle is being driven on a straight highway and both driving wheels are rotating at the same speed, the carrier C, together with the driving plate, the control plate 15, the control pins 16 and 16a, compensating rings 19 and 19a, and the eccentrics 22 will rotate as a unit. On the other hand, if a curve or turn is encountered, the wheel traveling on the outer rim of the curve will have to rotate at a higher speed than the inner wheel, and in that instance, there will be a differential movement between the axles D and E, as one rotates at a higher speed than the other, and due to this differential movement the driving plate will reciprocate on its longitudinal axis. The compensating rings will also reciprocate but on lines at right angles to the longitudinal axis of the driving plate, or the arms 14, and the control plate will oscillate as it is connected with the compensating rings through the control pins, the legs of which project into the slots 21 of the respective compensating rings, and as these slots are disposed on oposite sides, the compensating rings will reciprocate with relation to each other in opposite directions but always at right angles to the reciprocal movement of the driving plate.

The torque distributor or differential disclosed in this application has a number of advantages when comparison is made with a standard form of differential, as the driving torque is always transmitted to the wheels or axles in direct proportion to their torque resistance while in the standard form of differential the driving torque tends to dissipate itself in the wheel or axle having the least resistance. With a torque distributor of the type here disclosed it is impossible to spin one wheel without the other wheel turning in unison therewith, and consequently the tractive ability of both wheels is constantly available for driving, this in contra-distinction to the ordinary differential which is always free to spin the wheel affording the least resistance without transmitting any rotation to the other wheel.

The reason that power is transmitted to the wheels in proportion to the product of their tractive resistance and their speed, and torque in proportion to the tractive resistance is due to the following: First of all it must be remembered that the carrier C is positively driven through the gear 4 at all times, and so is the driving plate, the compensating rings 19 and 19a and the eccentrics driven thereby. Plainly speaking, there is a positive drive to each eccentric but the eccentrics may rotate at different speeds, and when rotated at different speeds, the power transmitted to each eccentric will be in proportion to their speed times their torque resistance. For instance, if when rounding a curve on a surface assumed to offer equal tractive resistance to both wheels, shaft D and eccentric 22 may rotate 5 R. P. M. and shaft E and its eccentric may rotate 10 R. P. M. In that instance the carrier, together with the driving plate and the compensating rings will rotate seven and one-half R. P. M., or in other words, at the average speed of the two driven shafts. Due to this difference in speed an oscillating movement is transmitted to the compensating rings in addition to their rotating movement and it is due to the oscillating movement that power is transferred from one compensating ring to the other through the control pins and the control plate 15; that is, from the eccentric rotating at the slower speed to the eccentric rotating at the higher speed, resulting in power being delivered to the respective axles or wheels in direct proportion to their speeds. The turning torque delivered to each axle in this instance is the same because it has been assumed that equal traction is afforded both wheels but the rate of power delivered is in proportion to the speed of each axle, as the eccentric rotating at the higher speed is receiving part of its power from the eccentric rotating at the slower speed. Hence, power is transmitted to the eccentric and the axle rotating at the higher speed, not only due to the rotation of the torque transmitting mechanism as a whole, but also due to the oscillating movement transmitted from one compensating ring to the other through means of the control plate 15. For this reason it may be said that the compensating rings function not only as compensating rings but also as driving rings.

If both wheels are rotating at the same speed, as when driving over a straight roadway, both shafts, both eccentrics, and both compensating rings, together with the driving plate and carrier, will rotate as a single solid unit. The control plate will not oscillate under these conditions, nor will the driving plate move transversely of the carrier; furthermore, the turning torque or power transmitted to each shaft will be equal, provided their tractive resistance is equal. If the tractive resistance of one wheel is reduced, as by entering a mudhole, both wheels will rotate at the same speed but the maximum power or turning torque will be transmitted to the other wheel due to the fact that there is a positive lock between the eccentrics, the compensating rings, the driving plate, and the carrier at all times when there is no change in speed between the wheels or axles. In fact, there can be no change in speed between the wheels or axles except under one condition and that is when both wheels have traction and one wheel is required to travel a greater distance than the other, as when rounding a curve, or when one wheel is driving over a flat surface and the other over an undulating surface, hence there is a positive lock between the driven axle and the torque transmission mechanism at all times except under the condition specified, and when that one condition is encountered the torque transmitted will be in proportion to the product of the tractive resistances and their speed.

The torque distributor illustrated in this application functions in a manner almost identical to the torque distributor in my co-pending application referred to, but the construction is simplified. The number of parts required is reduced and the structure as a whole is more compact and rigid in construction. Large bearing surfaces are provided throughout and loads and stresses are uniformly applied. Since all operating forces within the carrier act along straight radial lines and therefore are easily constrained, and since there are no thrust loads present, the carrier can be made both simple and light in construction in contrast to differentials in which thrust loads, which vary in proportion to the torque transmitted, are constantly present. In the present instance all possibility of the driven eccentrics cocking or tilting in relation to the assembly has been avoided, due to the internal type eccentrics shown which cause the radial loads, transmitted to them from the compensating rings, to come centrally on the carrier bearings in which the eccentrics are supported. In other words there is no lever arm existing between the point of application of the load and the point of restraint and therefore the operating forces do not act in such a way as to upset the alignment of the parts. The importance of this construction can best be appreciated when it is realized that any tilting or cocking of the eccentrics in the carrier will cause the edges of their bearing surfaces to take all of the operating loads, resulting in uneven wear and consequent shorter life.

It will also be noticed that by the present method of construction the torque impressed on the carrier by the driving gear 4 is transmitted directly to the driving plate, no force being transferred through the joint existing between the two carrier sections. Hence the bolts 11 are not called upon to transmit any of the driving torque, and since the torque distributor is constructed so that no axial thrust loads are generated within the carrier, these bolts 11 simply act to hold the two sections of the carrier together and maintain all the parts in assembled relation.

In Fig. 1 the eccentrics 22 are shown as secured to the axles D and E by means of a splined connection. This type of connection is desirable and essential in certain types of structures but may be modified or changed in other structures. For instance by referring to Fig. 11, it will be noted that the eccentric, indicated at 22a, is shown as formed integral with the axle. Such a construction is feasible in certain structures, and while this and other features are more or less specifically illustrated and described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A torque distributor comprising a driving shaft and a carrier driven thereby, a pair of driven axles, an eccentric secured to each axle, a compensating ring surrounded by each eccentric, said eccentrics and compensating rings being free to rotate relative to each other, a driving plate driven by the carrier and movable transversely thereof, and a positive driving connection between the driving plate and the compensating rings.

2. A torque distributor comprising a driving shaft and a carrier driven thereby, a pair of driven axles, an eccentric secured to each axle, a compensating ring surrounded by each eccentric, a slide-way formed at one end of each compensating ring, a driving plate driven by the carrier and disposed between the compensating rings, said driving plate being movable transversely of the carrier, and a slidable driving connection between the driving plate and the slide-ways on the respective compensating rings.

3. A torque distributor comprising a driving shaft and a carrier driven thereby, a pair of driven axles, an eccentric secured to each axle, a compensating ring surrounded by each eccentric, said eccentrics and compensating rings being free to rotate relative to each other, a driving plate driven by the carrier and movable transversely thereof, a positive driving connection between the driving plate and the compensating rings, said driving connection limiting movement of the compensating rings with relation to the driving plate to a reciprocal movement at right angles to the transverse movement of the driving plate, and other means carried by the driving plate and connected with the respective compensating rings whereby the reciprocal movement of the compensating rings will be in opposition to each other.

4. A torque distributor comprising a driving shaft and a carrier driven thereby, a pair of driven axles, an eccentric secured to each axle, a compensating ring surrounded by each eccentric, said eccentrics and compensating rings being free to rotate relative to each other, a driving plate driven by the carrier and movable transversely thereof, a positive driving connection between the driving plate and the compensating rings, said driving connection limiting movement of the compensating rings with relation to the driving plate to a reciprocal movement at right angles to the transverse movement of the driving plate, a control plate carried by the driving plate and free to oscillate therein, and means carried by said control plate and connected with the respective compensating rings whereby the reciprocal movement of the compensating rings will be in opposition to each other.

5. A torque distributor comprising a driving shaft and a carrier driven thereby, a pair of driven axles, an eccentric secured to each axle, a compensating ring surrounded by each eccentric, said eccentrics and compensating rings being free to rotate relative to each other, a driving plate driven by the carrier and movable transversely thereof, a positive driving connection between the driving plate and the compensating rings, said driving connection limiting movement of the compensating rings with relation to the driving plate to a reciprocal movement at right angles to the transverse movement of the driving plate, a control plate carried by the driving plate and free to oscillate therein, a pair of control pins carried by the control plate and free to oscillate therein, and a connection between each pin and an adjacent compensating ring whereby the reciprocal movement of the compensating rings will be limited to a reciprocal movement in opposition to each other.

6. In a torque distributor of the character described the combination with the compensating rings, and means for rotating the same, of an eccentric surrounding each compensating ring, said eccentrics and compensating rings being free to rotate relative to each other, and a bearing surrounding each eccentric and forming a support in which each eccentric is rotatable.

7. In a torque distributor of the character described the combination with the compensating rings and means for rotating the same, of an eccentric surrounding each compensating ring, said eccentrics and compensating rings being free to rotate relative to each other, a bearing surrounding each eccentric and forming a support in which each eccentric is rotatable, and an axle connected with each eccentric and driven thereby.

8. In a torque distributor of the character described the combination with a pair of compensating rings and means for rotating the same, of an internal eccentric surrounding each compensating ring, said eccentrics and compensating rings being free to rotate relative to each other, each eccentric having an exterior cylindrical surface, and a bearing surrounding and engaging the exterior cylindrical surface of each eccentric and in which the eccentrics are rotatable.

9. In a torque distributor of the character described the combination with a pair of compensating rings and means for rotating the same, of an internal eccentric surrounding each compensating ring, said eccentrics and compensating rings being free to rotate relative to each other, each eccentric having an exterior cylindrical surface, and a bearing surrounding and engaging the exterior cylindrical surface of each eccentric an in which the eccentrics are rotatable, said bearings, eccentrics and compensating rings being of substantially equal length so that a center line drawn midway between the ends of each bearing will pass substantially through a center line drawn midway between the ends of the eccentrics and the compensating rings supported in each bearing.

FRANK P. LAWLER.